(12) United States Patent
Chung et al.

(10) Patent No.: US 9,396,722 B2
(45) Date of Patent: Jul. 19, 2016

(54) METHOD AND APPARATUS FOR DETECTING SPEECH ENDPOINT USING WEIGHTED FINITE STATE TRANSDUCER

(71) Applicant: Electronic and Telecommunications Research Institute, Daejeon (KR)

(72) Inventors: Hoon Chung, Daejeon (KR); Sung-Joo Lee, Daejeon (KR); Yun-Keun Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/224,626

(22) Filed: Mar. 25, 2014

(65) Prior Publication Data

US 2014/0379345 A1    Dec. 25, 2014

(30) Foreign Application Priority Data

Jun. 20, 2013    (KR) .......................... 10-2013-0071143

(51) Int. Cl.
*G10L 15/04*    (2013.01)
*G10L 15/05*    (2013.01)
(Continued)

(52) U.S. Cl.
CPC ................. *G10L 15/05* (2013.01); *G10L 25/27* (2013.01); *G10L 25/87* (2013.01)

(58) Field of Classification Search
None
See application file for complete search history.

(56) References Cited

U.S. PATENT DOCUMENTS

| 4,277,645 A | * | 7/1981 | May, Jr. | .................. | H04J 3/175 |
|            |   |        |          |                    | 704/233 |
| 5,293,452 A | * | 3/1994 | Picone   | .................. | G10L 15/142 |
|            |   |        |          |                    | 704/250 |

(Continued)

FOREIGN PATENT DOCUMENTS

| JP | 2012-048119 | 3/2012 |
| KR | 10-0574883  | 4/2006 |

OTHER PUBLICATIONS

Hori, Takaaki, et al. "Low-latency real-time meeting recognition and understanding using distant microphones and omni-directional camera." Audio, Speech, and Language Processing, IEEE Transactions on 20.2 (2012): 499-513.*

(Continued)

*Primary Examiner* — Pierre-Louis Desir
*Assistant Examiner* — Jonathan Kim
(74) *Attorney, Agent, or Firm* — Staas & Halsey LLP

(57) ABSTRACT

Disclosed are an apparatus and a method for detecting a speech endpoint using a WFST. The apparatus in accordance with an embodiment of the present invention includes: a speech decision portion configured to receive frame units of feature vector converted from a speech signal and to analyze and classify the received feature vector into a speech class or a noise class; a frame level WFST configured to receive the speech class and the noise class and to convert the speech class and the noise class to a WFST format; a speech level WFST configured to detect a speech endpoint by analyzing a relationship between the speech class and noise class and a preset state; a WFST combination portion configured to combine the frame level WFST with the speech level WFST; and an optimization portion configured to optimize the combined WFST having the frame level WFST and the speech level WFST combined therein to have a minimum route.

12 Claims, 5 Drawing Sheets

(51) Int. Cl.
*G10L 25/87* (2013.01)
*G10L 25/27* (2013.01)

(56) References Cited

U.S. PATENT DOCUMENTS

| | | | | |
|---|---|---|---|---|
| 5,740,318 | A * | 4/1998 | Naito | G10L 25/87 704/248 |
| 6,249,757 | B1 * | 6/2001 | Cason | G10L 25/78 370/289 |
| 6,278,973 | B1 * | 8/2001 | Chung | G10L 15/183 704/231 |
| 6,415,253 | B1 * | 7/2002 | Johnson | G10L 21/0208 381/94.2 |
| 6,453,285 | B1 * | 9/2002 | Anderson | G10L 25/78 381/94.3 |
| 7,165,030 | B2 * | 1/2007 | Yi | G10L 13/06 704/238 |
| 8,099,277 | B2 * | 1/2012 | Yamamoto | G10L 25/87 704/231 |
| 8,131,545 | B1 * | 3/2012 | Moreno | G10L 15/04 704/235 |
| 8,965,763 | B1 * | 2/2015 | Chelba | G10L 15/063 704/231 |
| 8,972,243 | B1 * | 3/2015 | Strom | G10L 15/193 704/1 |
| 2002/0184017 | A1 * | 12/2002 | Lee | G10L 25/87 704/236 |
| 2003/0198328 | A1 * | 10/2003 | Li | H04M 3/56 379/202.01 |
| 2004/0176945 | A1 * | 9/2004 | Inagaki | G06F 17/2715 704/4 |
| 2005/0143978 | A1 * | 6/2005 | Martin | G10L 25/78 704/208 |
| 2005/0216261 | A1 * | 9/2005 | Garner | G10L 25/87 704/215 |
| 2010/0161326 | A1 * | 6/2010 | Lee | G10L 15/20 704/233 |
| 2010/0332225 | A1 * | 12/2010 | Arrowood | G10L 15/26 704/235 |
| 2011/0066578 | A1 * | 3/2011 | Chong | G06N 99/005 706/12 |
| 2012/0136659 | A1 * | 5/2012 | Kang | G10L 15/20 704/231 |
| 2012/0158401 | A1 * | 6/2012 | Mazurenko | G10L 25/81 704/208 |
| 2012/0166194 | A1 * | 6/2012 | Jung | G10L 15/02 704/238 |
| 2012/0221330 | A1 * | 8/2012 | Thambiratnam | G10L 25/84 704/235 |
| 2012/0323560 | A1 * | 12/2012 | Perez Cortes | G06F 17/2775 704/9 |
| 2013/0077538 | A1 * | 3/2013 | Plotnikov | H04L 12/1822 370/260 |
| 2013/0108160 | A1 * | 5/2013 | Yamazoe | G06K 9/723 382/177 |
| 2013/0138441 | A1 * | 5/2013 | Kim | G10L 15/083 704/254 |
| 2013/0325475 | A1 * | 12/2013 | Chung | G10L 15/05 704/253 |
| 2014/0081631 | A1 * | 3/2014 | Zhu | G10L 21/0208 704/226 |
| 2014/0303973 | A1 * | 10/2014 | Amarilli | G10L 15/08 704/235 |
| 2014/0372119 | A1 * | 12/2014 | Parada | G06F 17/30899 704/246 |
| 2015/0025887 | A1 * | 1/2015 | Sidi | G10L 17/16 704/245 |

OTHER PUBLICATIONS

Mohri, Mehryar, Fernando Pereira, and Michael Riley. "Weighted finite-state transducers in speech recognition." Computer Speech & Language 16.1 (2002): 69-88.*

Jongseo Sohn et al., "A Statistical Model-Based Voice Activity Detection", IEEE Signal Processing Letter, vol. 6, No. 1, pp. 246-253, Jan. 1999.

M.T. Johnson, "Capacity and Complexity of HMM duration modeling techniques," IEEE Signal Processig Letters, vol. 12, pp. 407-410, 2005.

D. Moore et al, "Juicer: A weighted finite state transducer speech coder," Proc. MLMI 2006 Washington DC.

* cited by examiner (a)　　　　　　　　(b)

(a) T1

(b) T2

(c) T1 ∘ T2

(a) An sample WFST (b) bestpath of the sample WFST

METHOD AND APPARATUS FOR DETECTING SPEECH ENDPOINT USING WEIGHTED FINITE STATE TRANSDUCER

CROSS-REFERENCE TO RELATED APPLICATIONS

This application claims the benefit of Korean Patent Application No. 10-2013-0071143, filed with the Korean Intellectual Property Office on Jun. 20, 2013, the disclosure of which is incorporated herein by reference in its entirety.

BACKGROUND

1. Technical Field

The present invention relates to a method and an apparatus for detecting a speech endpoint, specifically to a method and an apparatus for detecting a speech endpoint using a WFST.

2. Background Art

A speech recognition technology extracts features from people's speech transferred to a computer or a speech recognition system through a telephone, a microphone, and the like, analyzes them, and finds a closest result from a pre-inputted recognition list.

The key to increasing speech recognition performances in the speech recognition technology depends on how accurately a speech section is obtained between noises from a speech inputted with the noises. There has been a growing demand recently for a real time speech recognition technology, with the increased popularity of devices implemented with a voice-operated user interface. Accordingly, there have been a variety of studies on a speech section detection technology for accurately detecting a speech section, which is between the time when a speech is inputted and the time when the speech ends, of the speech inputted with noises.

It is generally known that the accuracy of the speech section detection technology depends on the performances of detecting the speech endpoint representing the end of the speech section. Moreover, the current level of the speech endpoint detection technology is the biggest reason why the speech recognition technology has not been very popularized. Therefore, it is urgently needed to improve the speech endpoint detection technology.

FIG. 1 is a block diagram showing an example of a conventional apparatus for detecting speech endpoint.

As FIG. 1 shows, a conventional apparatus 1 for detecting speech endpoint mainly includes a frame-level decision 10 and an utterance-level decision 20. The frame-level decision 10 receives a feature vector fv of a frame unit created by converting an input signal, and decides whether the feature vector fv of a frame unit is a speech or a non-speech. Then, the utterance-level decision 20 decides whether a speech section is detected from the result of the decision by the frame-level decision 10.

The frame-level decision 10 includes a speech decision portion 11 and a hang-over portion 12. The speech decision portion 11 decides whether the inputted feature vector fv of frame unit is a speech or a non-speech. However, error can be included in deciding a speech signal in frame units. Therefore, the frame-level decision 10 corrects the frame units of error by additionally implementing the hang-over portion 12. The hang-over portion 12 compensates the frame units of error in deciding the speech signal with an assumption that adjacent frames have high correlations.

The utterance-level decision 20 includes a state flow control portion 21 and a heuristic application portion 22. The state flow control portion 21 controls an internal flow for detecting an endpoint of an utterance unit according to a preset rule by use of the result decided by the frame-level decision 10. Moreover, the heuristic application portion 22 verifies whether the speech detected as an endpoint by the state flow control portion 21 is a speech endpoint or not. The heuristic application portion 22 verifies a speech endpoint generally by analyzing whether the length of speech detected as an endpoint satisfies a preset minimum length of speech (generally 20 ms) or not.

In the conventional apparatus 1 for detecting speech endpoint of FIG. 1, while the frame-level decision 10 uses a statistics-based decision logic, the utterance-level decision 20 mainly uses a rule-based logic. Accordingly, because the frame-level decision 10 and the utterance-level decision 20 use logics that are independent from each other, the independently configured logics need to be optimized individually even though they have a relevance of analyzing speech, and they often fail to manage overall optimal performances despite their individual optimization. Namely, global optimization is frequently not made. Moreover, as the utterance-level decision 20 mostly uses the rule-based logic, conflicts can occur between the rules when various rules are added, greatly hindering the optimizing of endpoint detection.

SUMMARY

The present invention provides an apparatus for detecting a speech endpoint that enables global optimization by detecting an endpoint by use of a WFST for a frame level decision and an utterance level decision that detect the endpoint with independent logic and that can easily add or delete rules without conflicts.

The present invention also provides a method for detecting a speech endpoint by use of a WFST.

An apparatus for detecting a speech endpoint in accordance with an embodiment of the present invention includes:

a speech decision portion configured to receive frame units of feature vector converted from a speech signal and to analyze and classify the received feature vector into a speech class or a noise class;

a frame level WFST configured to receive the speech class and the noise class and to convert the speech class and the noise class to a WFST format;

a speech level WFST configured to detect a speech endpoint by analyzing a relationship between the speech class and noise class and a preset state;

a WFST combination portion configured to combine the frame level WFST with the speech level WFST; and an optimization portion configured to optimize the combined WFST having the frame level WFST and the speech level WFST combined therein to have a minimum route The WFST combination portion combines the frame level WFST and the speech level WFST by use of a join operation ($\circ$), among basic operations of a WFST according to mathematical equation $$C = F \circ U,$$

whereas C denotes a combined WFST, F denotes a frame level WFST, and U denotes a speech level WFST.

The optimization portion optimizes the combined WFST by use of a minimize operation (min), among basic operations of the WFST according to mathematical equation $$D = \min(C)$$

whereas D denotes an optimized WFST.

The speech level WFST includes 6 states of NOISE, SPEECH, Sn, Nn, BOU (begin of utterance), and EOU (end of utterance) in accordance with the speech class and the noise class and is implemented according to mathematical equation $$A = (\Sigma, Q, i, F, E, \lambda, \rho)$$

$$\Sigma \times (H_0, H_1)$$

$$Q = (\text{NOISE}, \text{SPEECH}, BOU, EOU, Sn, Nn),$$

whereas NOISE denotes a noise state, SPEECH denotes a speech state, BOU denotes a speech start state, EOU denotes a speech end state, Sn denotes an nth (n being a natural number) speech waiting state, and Nn denotes an nth noise waiting state, and whereas i is an initial, NOISE state and F is a final state set, which is EOU, and whereas E denotes a transition function set, and $\lambda$ and $\rho$ denote a speech class (H) weight and a noise class weight, respectively.

The speech level WFST sets a number of a speech waiting state Sn corresponding to a preset minimum speech frame count $T_m$, and sets a number of noise waiting state Nn corresponding to a latter part silent frame count $T_b$.

The speech level WFST applies a hang-over technique additionally in order to prevent errors of misclassifying the speech class and the noise class from being generated and is implemented according to mathematical equation $$A = (\Sigma, Q, i, F, E, \lambda, \rho)$$

$$\Sigma \times (H_0, H_1)$$

$$Q = (\text{NOISE}, \text{SPEECH}, BOU, EOU, Sn, Nn, Vn),$$

whereas Vn is an nth hang-over state.

The speech level WFST sets the number of hang-over states for the each speech waiting state to be smaller than the latter part silent frame count $T_b$, and sets the number of hang-over states for the each noise waiting state to be smaller than the minimum speech frame count $T_m$.

A method for detecting a speech endpoint by receiving frame units of feature vector converted from a speech signal and detecting a speech endpoint by use of an apparatus for detecting a speech endpoint, the apparatus for detecting a speech endpoint executes:

analyzing and classifying the feature vector into a speech class and a noise class;

creating a frame level WFST by converting the speech class and the noise class to a WFST format after receiving the speech class and the noise class;

creating a speech level WFST detecting a speech endpoint by analyzing a relationship between the speech class and noise class and a preset state;

obtaining a combined WFST by combining the frame level WFST with the speech level WFST; and optimizing the combined WFST.

DETAILED DESCRIPTION

Figure 1:
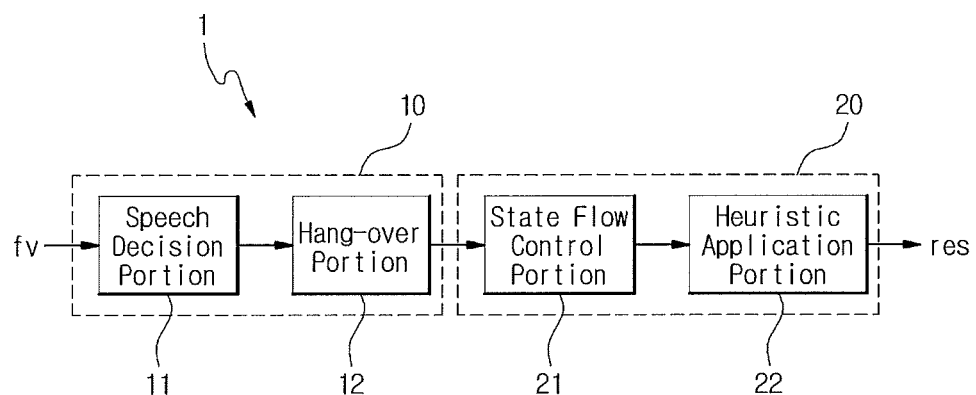
FIG. 1 is a block diagram showing an example of a conventional apparatus for detecting speech endpoint.

The appended drawings and the descriptions on the drawings illustrating embodiments of the present invention shall be referred in order to understand the purposes of the present invention and the advantages in operations of the present invention.

Hereinafter, the present invention will be described in detail by describing the embodiments of the present invention with the appended drawings. However, the present invention can be embodied in various forms and shall not limit to the described embodiment. In order to clearly describe the invention, some parts that are irrelevant to the description will be omitted, and the same reference numerals in the drawings will be used to represent the same members.

In the specification, when it is described that a certain portion "comprises" a certain component, it does not mean to exclude other components and it means that other components may be further comprised unless contrarily described. In addition, the terms such as "portion", "device", "module", or "block" mean a unit being capable of processing at least one of functions or operations, so they can be realized by hardware, software, and a combination of hardware and software.

Figure 2:
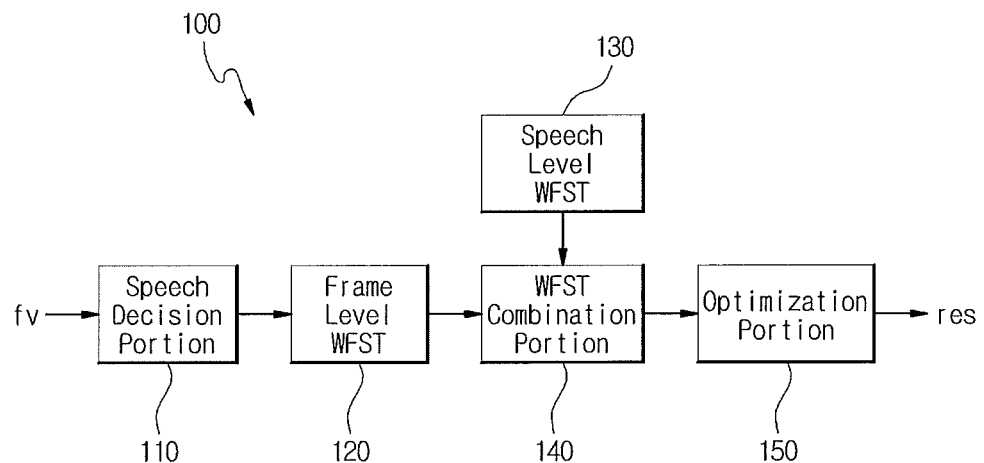
FIG. 2 is a block diagram showing an apparatus for detecting speech endpoint in accordance with an embodiment of the present invention.

FIG. 2 is a block diagram showing an apparatus for detecting speech endpoint in accordance with an embodiment of the present invention.

With reference to FIG. 2, the apparatus for detecting speech endpoint 100 has a speech decision portion 110, a frame level WFST 120, a speech level WFST 130, a WFST combination portion 140, and an optimization portion 150.

The speech decision portion 110 decides whether a feature vector fv in a frame unit is a speech or a non-speech in the same way that the speech decision portion 11 of the conventional apparatus for detecting speech endpoint 1 does. Then, the decision result is sent to the frame level WFST 120.

The speech decision portion 110 receives the feature vector fv in the frame unit that is converted from an input analog speech signal through a speech input means (not depicted) such as microphone, and classifies speech $H_1$ or noise $H_0$ after analyzing the received feature vector fv. Although various techniques to classify to speech $H_1$ or noise $H_0$ after the speech decision portion 110 received the feature vector fv has been known diversely, the present invention will be described by assuming to use, for example, the likelihood ration testing (LRT) based classification.

The decision rule for the likelihood ration testing (LRT) based classification follows mathematical equation 1.

$$\frac{P(X:H_1)}{P(X:H_0)} > T_d \qquad \text{[Mathematical equation 1]}$$

Where, X denotes the feature vector fv, $H_0$ and $H_1$ denote a noise class and a speech class respectively, $P(X:H_1)$ and $P(X:H_0)$ denote a probability of the class respectively, and $T_d$ is a threshold value to decide whether the feature vector fv is a speech class $H_1$ or a noise class $H_0$.

Although the speech decision portion 110 is described above to make a binary decision on the feature vector fv as a speech class $H_1$ or a noise class $H_0$, a soft decision result can be output in some cases.

The speech decision portion 110 can simply analyze the feature vector fv based on probability to classify into the speech class $H_1$ or the noise class $H_0$, but cannot recognize an endpoint of speech. Moreover, as the classification as the speech class $H_1$ and the noise class $H_0$ that is done by the speech decision portion 110 is an arbitrary classification, namely, an assumption for classifying the speech class $H_1$ and the noise class $H_0$, the speech decision portion 110 cannot identify whether the received feature vector is the speech or the noise 100% clearly. Accordingly, the speech decision portion 110 classifies as a speech class $H_1$ or a noise class $H_0$ based on probability as described above.

The frame level WFST 120 applies WFST (Weighted Finite State Transducer) to the decision result from the speech decision portion 110. Because the speech decision portion 110 performs simply classifying as a speech class $H_1$ or a noise class $H_0$, it is not easy to combine with the speech level WFST 130. Accordingly, the frame level WFST 120 converts the classification result of the speech decision portion 110 to a WFST to be combined with the speech level WFST 130.

A WFST is a finite state automaton (FST) indicates a state transition in an input symbol and an output symbol, and allocates a weight to each transition. The purpose of the FST, as a methodology for speech recognition, is enabling to represent all knowledge sources used in speech recognition as a single combined framework and providing a well-defined mathematical optimized methodology. In the WFST that is FST combined with a weight when a state is transited, input symbol sequences (frames including a feature vector in the present invention) are mapped to output symbol sequences with route weights computed on all valid routes through the transition. Here, the each route weight is a function for the entire state transition weights allocated to the corresponding routes. Algorithms for a WFST and detailed mathematical explanations are known technology and they are described in D Moore, J Dines, M M Doss, J Vepa, O Cheng, T Hain, "Juicer: A weighted finite state transducer speech coder," Proc. MLMI 2006 Washington D.C. and M. T Johnson: "Capacity and complexity of HMM duration modeling techniques," IEEE Signal Processing Letters, vol. 12, pp. 407-410, 2005.

Figure 3:
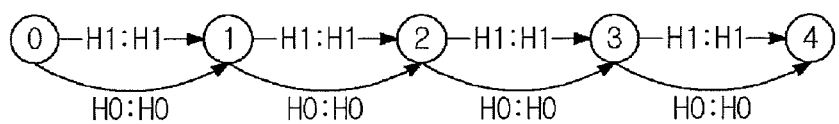
FIG. 3 is a diagram to show an example of frame level WFST in FIG. 2.

FIG. 3 is a diagram to show an example of frame level WFST in FIG. 2.

The frame level WFST 120 converts the speech and noise classes $H_0$, $H_1$ classified by the speech decision portion 110 to a WFSF including a state of a speech state $H_1$ and a noise state $H_0$ as illustrated in FIG. 3.

The frame level WFST 120 in FIG. 3 receives the speech class $H_1$ or the noise class $H_0$, which is the result of deciding the feature vector in the speech decision portion 110, transits the received speech class $H_1$ and the noise class $H_0$ sequentially to be transited to the final state, and outputs the state value.

The weight in the frame level WFST 120 can be represented by a binary number or a real number according to a binary decision or a soft decision which the speech decision portion 110 makes. Since the speech decision portion 110 in the present invention is assumed to perform the binary decision, the weight will be represented by a binary number.

In addition, the speech level WFST 130 is configured to be able to detect a speech endpoint (EOU) by analyzing the relationship between the classified classes $H_0$, $H_1$ and the state to be decided. The speech level WFST 130 includes 6 states such as NOISE, SPEECH, Sn, Nn, BOU (Begin of utterance), EOU (End of utterance) in accordance with the two input classes $H_0$ and $H_1$ And the initial state is set for a NOISE state and the final state is set for a EOU state. In 6 states, NOISE denotes a noise state, SPEECH denotes a speech state, BOU denotes a speech start state, EOU denotes a speech end state, Sn denotes an nth (n being a natural number) speech waiting state, and Nn denotes an nth noise waiting state.

The speech level WFST 130 is represented by mathematical equation 2.

$$A=(\Sigma,Q,i,F,E,\lambda,\rho)$$

$$\Sigma \times (H_0, H_1)$$

$$Q=(NOISE, SPEECH, BOU, EOU, Sn, Nn),$$ [Mathematical equation 2]

Where, i denotes an initial state with i∈Q, and F denotes a final state set with F⊆Q. E denotes a transition function set, and λ and ρ denote a speech class (H) weight and a noise class weight respectively.

Figure 4:
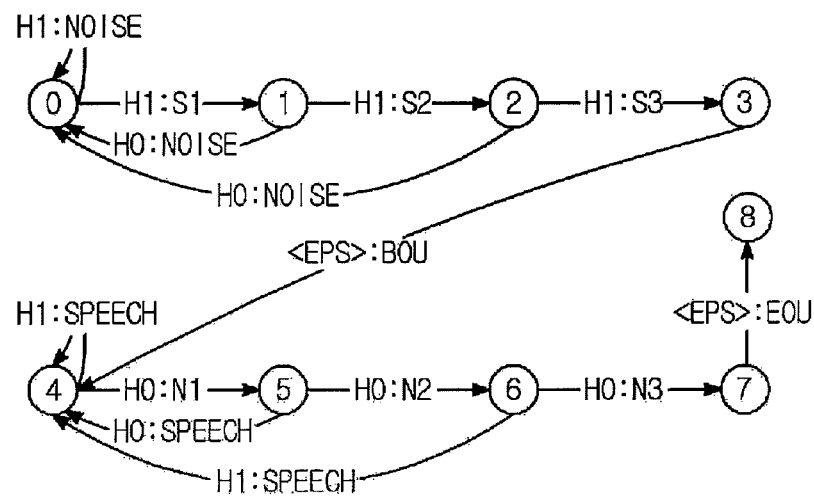
FIG. 4 is a diagram to show an example of speech level WFST in FIG. 2.

FIG. 4 is a diagram to show an example of speech level WFST in FIG. 2.

The speech level WFST 130 in FIG. 4 stays in an initial state, NOISE state (node 0) while a noise class $H_0$ is being input from the speech decision portion 110. However, it transits to the first speech waiting state S1 when the speech class $H_1$ is input. Then, the speech level WFST 130 transits to the second speech waiting state S2 if the speech class $H_1$ is input again, whereas the speech level WFST 130 transits to NOISE state, which is the initial state, if the noise class $H_0$ is input. If the speech class $H_1$ is input consecutively as many as a preset minimum speech frame count $T_m$ (in this example, 3), the speech level WFST 130 transits to the third speech waiting state S3, and then transits to BOU state by deciding that a speech section has been started instantly. And the BOU state is transited to SPEECH state again. The speech level WFST 130 stays in the SPEECH state if the speech class $H_1$ is input again in the SPEECH state, whereas it transits to N1 state, which is the first noise waiting state, if the noise class $H_0$ is input. The speech level WFST 130 transits to the SPEECH state if the speech class $H_1$ is input when the speech level WFST is in the first noise waiting state N1, whereas the speech level WFST 130 can decide that the speech section has been ended (EOU), namely an endpoint is detected, if the noise class $H_0$ is consecutively input as many as a latter part silent frame count $T_b$ (in this example, 3).

Here, the minimum speech frame count $T_m$ is a variable for deciding that the speech section was started (BOU) only when the speech class $H_1$ is input more than the preset frame, and the latter part silent frame count $T_b$ is a variable for deciding that the speech section was ended (EOU) only when the noise class $H_0$ is input more than the preset frame after the BOU state. In FIG. 4, since it is assumed that the minimum speech frame count $T_m$ and the latter part silent frame count $T_b$ are set for 3 respectively, the number of speech waiting states S1, S2, S3 from initial NOISE state to the BOU state is illustrated as 3, and the number of noise waiting states N1, N2, N3 from SPEECH state to EOU state is illustrated as 3 as well. Because the minimum speech frame count $T_m$ and the later part silent frame count $T_b$ are set for 3 respectively, in order to be the BOU state in FIG. 4, the speech class $H_1$ needs to be input 3 times consecutively when in NOISE state, and in order to be the EOU state, the noise class $H_0$ needs to be input 3 times consecutively after the SPPECH state.

Although the speech level WFST 130 can detect the speech endpoint after receiving the classified speech class $H_1$ and the classified noise class $H_0$ from the speech decision portion 110, the speech level WFST 130 in the present invention is combined with the frame level WFST 120 in the WFST combination portion 140 which will be described below. Therefore, the speech level WFST 130 being combined with the frame level WFST 120 does not need to be input directly, and needs to include only a WFST structure considering the minimum speech frame count $T_m$ and the latter part silent frame count $T_b$.

So far, the speech level WFST 130 transits to the BOU state simply if the speech class $H_1$ is consecutively input more than the minimum speech frame count $T_m$, and after that if the noise class $H_0$ is consecutively input more than the latter part silent frame count $T_b$, it transits to the EOU state.

However, the BOU state transit and the EOU state transit in which only the minimum speech frame count $T_m$ and the latter part silent frame count $T_b$ are considered can generate unintended errors. For example, if a misclassified noise class $H_0$ is input in the first speech waiting state S1 or the second speech waiting state S2, the speech level WFST 130 transits to the NOISE state. The NOISE state transit due to the misclassification may be led to an obstacle to detect an accurate endpoint. That is, since it is set not to transit to the BOU state if the speech class $H_1$ is not consecutively input more than the minimum speech frame count $T_m$ in the NOISE state, so if the misclassification is included, it is difficult to transit to the EOU state after the BOU state. In the same way, since it is set not to transit to the EOU state if the noise class $H_0$ is not consecutively input more than the latter part silent frame count $T_b$, if the misclassification is included, it is difficult to transit to the EOU state, thus it is difficult to detect an accurate endpoint.

The best way to resolve those issues is not to generate the misclassification, but there has no speech decision portion 110 been developed to be able to classify a speech class $H_1$ and a noise class $H_0$ without generating the misclassification. This is because that the speech decision portion 110 classifies the speech class $H_1$ and the noise class $H_0$ largely based on probability considering a deviation of people's speech.

Accordingly, in the present invention, a hang-over technique based on an idea that there is a strong relationship in consecutively obtained speech frames can be applied additionally to the speech level WFST. The hang-over technique is a technique to smooth state transition errors by delaying by a preset hang-over frame count $T_v$.

Figure 5:
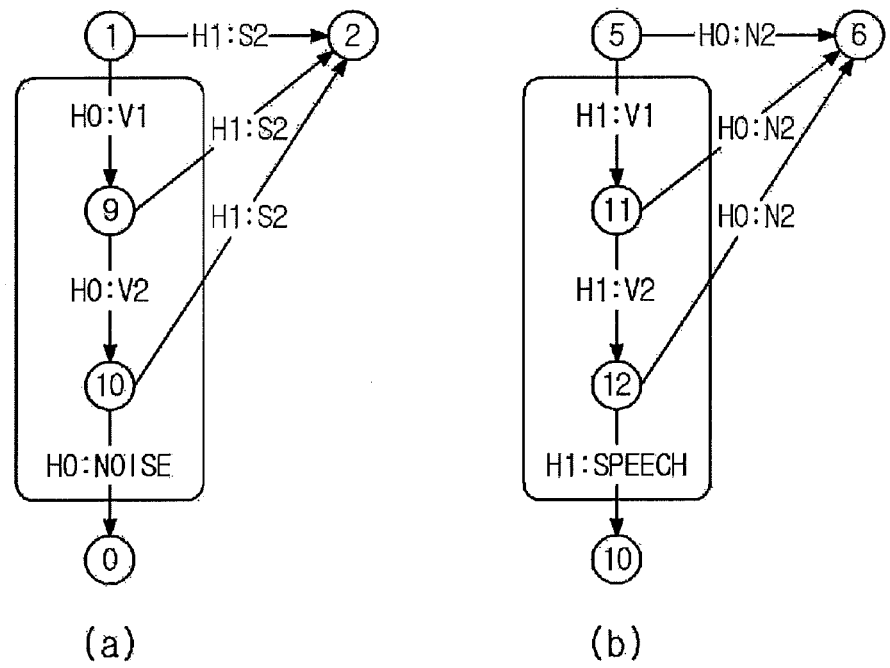
FIG. 5 is a diagram to show an example of hang-over WFST.

FIG. 5 is a diagram to show an example of hang-over WFST.

The (a) in FIG. 5 denotes a case that a hang-over technique is applied to the first speech waiting state S1 in FIG. 4 and a hang-over frame count $T_v$ is 2. And the (b) denotes a case that a hang-over technique is applied to the first noise waiting state N1 in FIG. 4, and a hang-over frame count $T_v$ is 2.

As shown in (a) in FIG. 5, when the hang-over technique is applied to WFST, although a noise class $H_0$ is input in the first speech waiting state S1, it does not transit to the NOISE state directly unlike in FIG. 4, but rather transits to a hang-over state V1. That is, when the noise class $H_0$ is input under the hang-over count $T_v$, then as it transits to the hang-over states V1, V2, not to the NOISE state or second speech waiting state S2, the errors by misclassification can be reduced. In the same way in the (b) in FIG. 5, the hang-over frame count $T_v$ is set for 2 in order to prevent errors by misclassification in a first noise waiting state N1 from being generated, and accordingly although a speech class $H_1$ is input for 2 times consecutively in the noise waiting state N1, it does not transit to the SPEECH state or the second noise waiting state N2, and rather transits to hang-over states V1, V2. That is, the possibility to generate errors by misclassification can be reduced.

Figure 6:
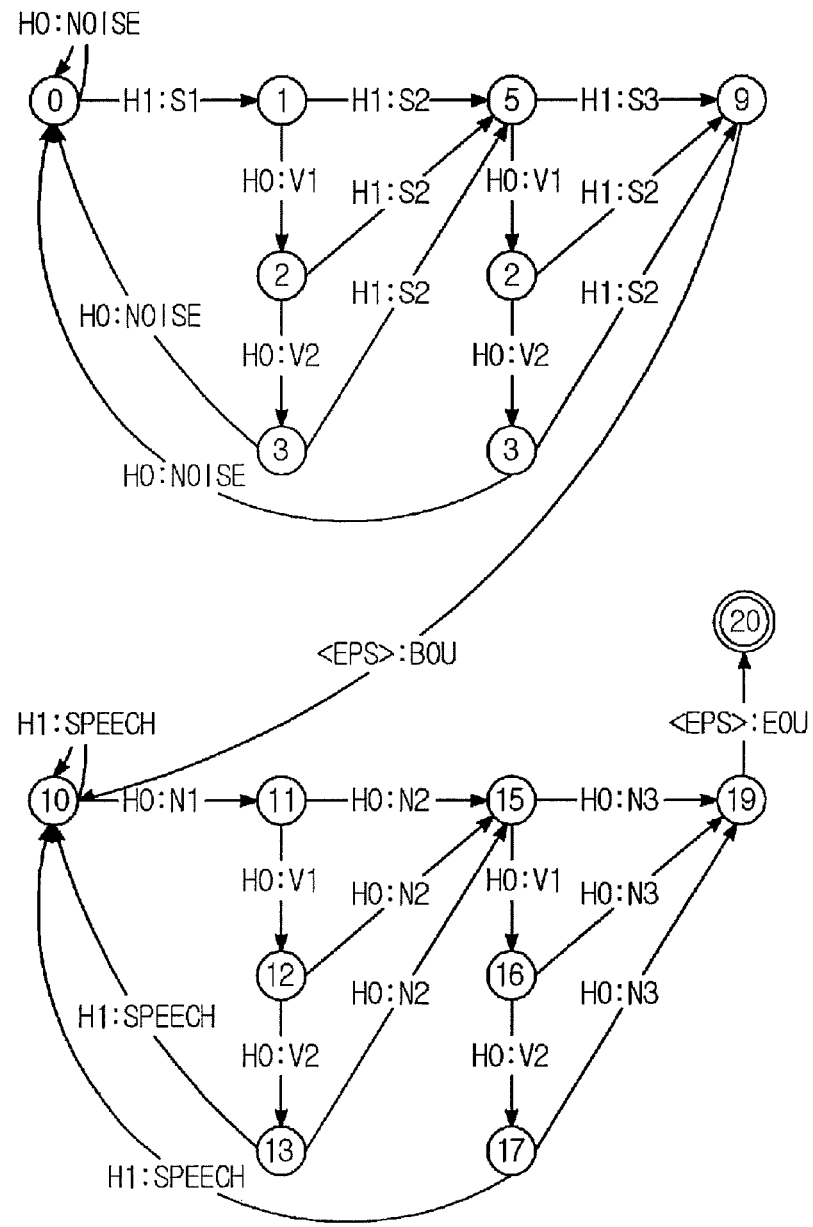
FIG. 6 is a diagram to show an example of hang-over technique applied to the speech level WFST in FIG. 4.

FIG. 6 is a diagram to show an example of hang-over technique applied to the speech level WFST in FIG. 4.

In the speech level WFST in FIG. 6, the hang-over technique is applied to the first and second speech waiting states S1, S2 and the second noise waiting states N1, N2 respectively in the speech level WFST in FIG. 4. And in the same way as FIG. 5, the hang-over frame count $T_v$ is applied by 2. Accordingly, since the speech level WFST does not transit to the NOISE state, although the noise class $H_0$ is input for 2 times in the first and second speech waiting states S1, S2 respectively and the speech level WFST does not transit to the SPEECH state although the speech class $H_1$ is input for 2 times consecutively in the first and second noise waiting states N1, N2 respectively, the endpoint can be detected safely.

Here, the hang-over frame count $T_v$ may be set smaller than the minimum speech frame count $T_m$ and the latter part silent frame count $T_b$. Therefore, since the minimum speech frame count $T_m$ and the latter part silent frame count $T_b$ in FIG. 6 are set for 3 respectively, so the hang-over frame count $T_v$ is set for 2. And when the values of the minimum speech frame count $T_m$ and the latter part silent frame count $T_b$ are different, the hang-over frame count $T_v$ can be set with different values to the first and second speech waiting states S1, S2 and the first and second noise waiting states N1, N2 respectively. For example, when the minimum speech frame count $T_m$ is 5 and the latter part silent frame count $T_b$ id 4, then the hang-over frame count $T_v$ for each the first and second speech waiting states S1, S2 can be set for 3, which is smaller than the latter part silent frame count $T_b$, and the hang-over frame count $T_v$ for each the first and second noise waiting states N1, N2 can be set for 3, which is smaller than the minimum speech frame count $T_m$.

The speech level WFST 130 to which the hang-over technique is applied is represented by mathematical equation 3.

$$A=(\Sigma,Q,i,F,E,\lambda,\rho)$$

$$\Sigma \times (H_0,H_1)$$

$$Q=(NOISE, SPEECH, BOU, EOU, Sn, Nn, Vn) \quad \text{[Mathematical equation 3]}$$

Where, Vn denotes an nth hang-over state.

The WFST combination portion 140 combines the frame level WFST 120 and the speech level WFST 130. The WFST supports several arithmetic operations. The WFST combination portion 140 is used for combining the different levels' WFSTs of the frame level WFST 120 and the speech level WFST 130 by use of a join operation ($\circ$) which is one of the basic operations of the WFST. The join operation $\circ$ can be represented as $C = A \circ B$.

$C = A \circ B$ is an operation to implement a transducer C by combining two transducers (A and B). For example, the transducer C that combines the two transducers (A and B) having an x/y and y/z as input/output symbols respectively has the input/output symbols as x/z, and has weights that are computed to assign the same weights to the all possible input/output sequences compared to the original transducers (A and B).

Figure 7:
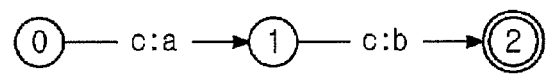
FIG. 7 is a diagram to show a simplified example of a join operation performed by a WFST combination portion.
Figure 7:
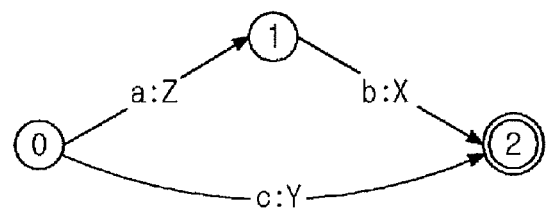
Figure 7:
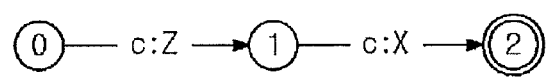

FIG. 7 is a diagram to show a simplified example of a join operation performed by a WFST combination portion.

FIG. 7 shows a way of how to combine two WFSTs T1, T2 by use of a join operation ($\circ$). With reference to FIG. 7, a WFST T1 receives c as an input symbol and outputs a and b as output symbols, and a WFST T2 receives a, b, and c as input symbols and outputs Z, X, Y as output symbols. And T1$\circ$T2 which combines the two WFSTs T1, T2 by the join operation (○) is configured to receive c as an input symbol and output Z and X as output symbols. That is, the output symbol of T2 can be output by receiving the input symbol of T1. Although it is not depicted, T1○T2 has weights that are set to be corresponded to combining the two WFSTs T1, T2.

The WFST combination portion 140 can combine the frame level WFST 120 with the speech level WFST 130 by use of the join operation (○) of the WFST. When the frame level WFST 120 is denoted by F and the speech level WFST 130 is denoted by U, the WFST combination portion 140 can perform the arithmetic operation of mathematical equation 4 and obtain a combined WFST.

$$C = F \bigcirc U \quad \text{[Mathematical equation 4]}$$

Finally, the optimization portion 150 performs an optimization for the WFST combined by the WFST combination portion 140. A minimize operation min that is one of basic operations of the WFST is used to optimize the combined WFST. The minimize operation of the WFST enables the WFST to have a minimum state and a minimum transit.

The optimization portion 150 optimizes the combined WFST by use of the minimize operation min as mathematical equation 5.

$$D = \min(C) \quad \text{[Mathematical equation 5]}$$

Figure 8:
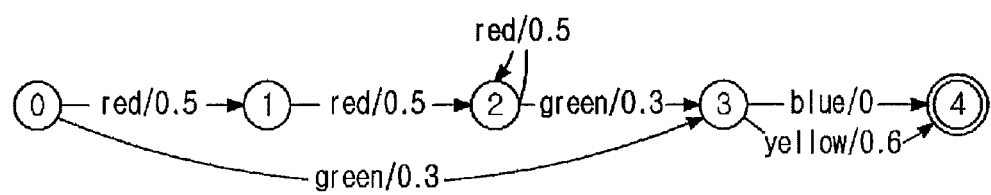
FIG. 8 is a diagram to show a simplified example of a minimize operation performed by an optimization portion.
Figure 8:
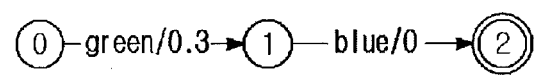

FIG. 8 is a diagram to show a simplified example of a minimize operation performed by an optimization portion.

When analyzing the WFST in (a) of FIG. 8, the states for red inputs are useless because it transits to the $3^{rd}$ node ultimately by the state for green input. Accordingly, for the simplification, it becomes to be minimized to apply the state transition for green input only in (b).

Since the WFST's join operation (○) and minimize operation are known techniques, no additional detailed descriptions will be followed.

Although, the apparatus for detecting speech endpoint by use of a WFST was illustrated in FIG. 2, since a method to detect speech endpoint by use of a WFST has the same flows as the apparatus', no detailed descriptions for the method will be followed.

As described above, the apparatus for detecting speech endpoint by use of a WFST enables to classify the speech class $H_1$ and the noise class $H_0$ clearly by verifying the speech class $H_1$ and the noise class $H_0$ classified by the speech decision portion 110 again in the frame level WFST 120, and to detect endpoint easily by utilizing the speech level WFST 130. Moreover, combining the frame level WFST 120 and the speech level WFST 130 by use of a join operation by the WFST combination portion 140 prevents errors by adding and deleting rules from being generated, and as the optimization portion 150 minimizes the combined WFST route, the apparatus for detecting speech endpoint can be optimized globally. Applying the hang-over technique to the WFST can also reduce the errors in detecting a speech endpoint by misclassification.

The method in accordance with the present invention can be realized by computer program stored in computer-readable media. The computer-readable media can include all kinds of recording media such as ROM, RAM, CD-ROM, magnetic tape, floppy disk, and optical recording media and carrier wave media (e.g. transfer through Internet) can be included. Also the computer-readable media can store computer readable codes in the systems connected with distributed network and make the computer read and execute the codes in distributed method.

While the present invention has been described with reference to a certain embodiment, the embodiment is for illustrative purposes only and shall not limit the present invention. It is to be appreciated that various permutations and modifications of the present invention are possible by those skilled in the art without departing from the original intention of the invention, which shall be defined by the claims appended below. The protected scope of the present invention shall be understood by the scope of claims below, and all technical ideas reside in the scope of claims shall be included in the rights of the present invention.

What is claimed is:

1. An apparatus for detecting a speech endpoint, comprising:
    a voice-operated user interface to receive a speech signal using a speech input device;
    a storage to store the speech signal received by the voice-operated user interface; and
    a special purpose computer comprising at least one specially programmed processor to execute one or more programs to perform speech recognition by detecting a speech endpoint of the speech signal, the at least one specially programmed processor comprising:
        a speech decision portion configured to receive frame units of a feature vector converted from the speech signal and to analyze and classify the received feature vector into a speech class or a noise class;
        a frame level weighted finite state transducer (WFST) configured to receive the speech class and the noise class and to convert the speech class and the noise class to a WFST format;
        a speech level WFST configured to detect a speech endpoint by analyzing a relationship between the speech class and noise class and a preset state;
        a WFST combination portion configured to combine the frame level WFST with the speech level WFST; and
        an optimization portion configured to optimize the combined WFST having the frame level WFST and the speech level WFST combined therein to have a minimum route,
    wherein the special purpose computer performs speech recognition based on the detected speech endpoint of the speech signal.

2. The apparatus of claim 1, wherein the WFST combination portion is configured to combine the frame level WFST with the speech level WFST by use of a join operation (○), among basic operations of a WFST, according to mathematical equation whereas C denotes a combined WFST, F denotes a frame level WFST, and U denotes a $$C = F \bigcirc U,$$

whereas C denotes a combined WFST, F denotes a frame level WFST, and U denotes a speech level WFST.

3. The apparatus of claim 2, wherein the optimization portion is configured to optimize the combined WFST by use of a minimize operation (min), among basic operations of the WFST, according to mathematical equation $$D = \min(C),$$

whereas D denotes an optimized WFST.

4. The apparatus of claim 3, wherein the speech level WFST includes six states of NOISE, SPEECH, Sn, Nn, BOU (begin of utterance), and EOU (end of utterance) in accordance with the speech class $H_1$ and the noise class $H_0$ and is implemented according to mathematical equation $$A = (\Sigma, Q, i, F, E, \lambda, \rho)$$

$$\Sigma \times (H_0, H_1)$$

$$Q = (NOISE, SPEECH, BOU, EOU, Sn, Nn),$$

whereas NOISE denotes a noise state, SPEECH denotes a speech state, BOU denotes a speech start state, EOU denotes a speech end state, Sn denotes an nth (n being a natural number) speech waiting state, and Nn denotes an nth noise waiting state, and whereas i is an initial state set for a NOISE state and F is a final state set, which is EOU, and whereas E denotes a transition function set, and A and p denote a speech class weight and a noise class weight, respectively.

5. The apparatus of claim 4, wherein the speech level WFST is configured to set a number of a speech waiting state Sn corresponding to a preset minimum speech frame count $T_m$, and to set a number of noise waiting state Nn corresponding to a latter part silent frame count $T_b$.

6. The apparatus of claim 5, wherein the speech level WFST is configured to apply a hang-over technique additionally in order to prevent errors of misclassifying the speech class and the noise class from being generated and is implemented according to mathematical equation $$A=(\Sigma,Q,i,F,E,\lambda,\rho)$$

$$\Sigma \times (H_0, H_1)$$

$$Q=(NOISE, SPEECH, BOU, EOU, Sn, Nn, Vn),$$

whereas Vn is an nth hang-over state.

7. The apparatus of claim 6, wherein the speech level WFST is configured to set the number of hang-over states for the each speech waiting state to be smaller than the latter part silent frame count $T_b$, and to set the number of hang-over states for the each noise waiting state to be smaller than the minimum speech frame count $T_m$.

8. A method for performing speech recognition by detecting a speech endpoint, the method comprising:
   receiving a speech signal obtained through a speech input device of a voice-operated user interface;
   storing the received speech signal in a storage;
   receiving frame units of a feature vector converted from the speech signal stored in the storage;
   analyzing and classifying the feature vector into a speech class and a noise class;
   creating a frame level weighted finite state transducer (WFST) by converting the speech class and the noise class to a WFST format after receiving the speech class and the noise class;
   creating a speech level WFST detecting a speech endpoint by analyzing a relationship between the speech class and noise class and a preset state;
   obtaining a combined WFST by combining the frame level WFST with the speech level WFST;
   optimizing the combined WFST; and
   performing speech recognition based on the detected speech endpoint of the speech signal,
   wherein the analyzing and classifying the feature vector, creating the frame level WFST, creating the speech level WFST, obtaining the combined WFST, optimizing the combined WFST, and performing speech recognition are performed using at least one specially programmed processor of a special purpose computer.

9. The method of claim 8, wherein, obtaining the combined WFST comprises combining the frame level WFST and the speech level WFST by use of a join operation ($\circ$), among basic operations of a WFST, according to mathematical equation $$C = F \circ U,$$

whereas C denotes a combined WFST, F denotes a frame level WFST, and U denotes a speech level WFST.

10. The method of claim 9, wherein, optimizing the combined WFST comprises using a minimize operation (min), among basic operations of the WFST, according to mathematical equation $$D = \min(C),$$

whereas D denotes an optimized WFST.

11. The method of claim 9, wherein the creating of a speech level WFST includes six states of NOISE, SPEECH, Sn, Nn, BOU (begin of utterance), and EOU (end of utterance) in accordance with the speech class $H_1$ and the noise class $H_0$ and is implemented according to mathematical equation $$A=(\Sigma,Q,i,F,E,\lambda,\rho)$$

$$\Sigma \times (H_0, H_1)$$

$$Q=(NOISE, SPEECH, BOU, EOU, Sn, Nn),$$

whereas NOISE denotes a noise state, SPEECH denotes a speech state, BOU denotes a speech start state, EOU denotes a speech end state, Sn denotes an nth (n being a natural number) speech waiting state, and Nn denotes an nth noise waiting state, and whereas i is an initial state set for a NOISE state and F is a final state set, which is EOU, and whereas E denotes a transition function set, and A and p denote a speech class weight and a noise class weight, respectively.

12. A non-transitory recording media having one or more computer-readable programs written therein, that when executed performs a method for performing speech recognition by detecting a speech endpoint, the method comprising:
   receiving a speech signal obtained through a speech input device of a voice-operated user interface;
   storing the received speech signal in a storage;
   receiving frame units of a feature vector converted from the speech signal stored in the storage;
   analyzing and classifying the feature vector into a speech class and a noise class;
   creating a frame level weighted finite state transducer (WFST) by converting the speech class and the noise class to a WFST format after receiving the speech class and the noise class;
   creating a speech level WFST detecting a speech endpoint by analyzing a relationship between the speech class and noise class and a preset state;
   obtaining a combined WFST by combining the frame level WFST with the speech level WFST;
   optimizing the combined WFST; and
   performing speech recognition based on the detected speech endpoint of the speech signal,
   wherein the analyzing and classifying the feature vector, creating the frame level WFST, creating the speech level WFST, obtaining the combined WFST, and optimizing the combined WFST, and performing speech recognition are performed using at least one specially programmed processor of a special purpose computer.

* * * * *